US008646075B2

(12) United States Patent
Yu

(10) Patent No.: US 8,646,075 B2
(45) Date of Patent: Feb. 4, 2014

(54) ANALYSIS SYSTEM FOR UNKNOWN APPLICATION LAYER PROTOCOLS

(75) Inventor: Shunzheng Yu, Guangdong (CN)

(73) Assignee: Sun Yat-Sen University, Guangdong (CN)

( * ) Notice: Subject to any disclaimer, the term of this patent is extended or adjusted under 35 U.S.C. 154(b) by 0 days.

(21) Appl. No.: 13/456,225

(22) Filed: Apr. 26, 2012

(65) Prior Publication Data

US 2012/0210426 A1 Aug. 16, 2012

Related U.S. Application Data

(63) Continuation-in-part of application No. PCT/CN2009/074858, filed on Nov. 9, 2009.

(30) Foreign Application Priority Data

Oct. 30, 2009 (CN) .......................... 2009 1 0193469

(51) Int. Cl.
*G06F 11/00* (2006.01)

(52) U.S. Cl.
USPC .......................................................... 726/22

(58) Field of Classification Search
USPC .......................................................... 726/22
See application file for complete search history.

(56) References Cited

U.S. PATENT DOCUMENTS 8,205,263 B1 * 6/2012 Kennedy ........................ 726/25

8,331,234 B1 * 12/2012 Newton et al. ................ 370/231
2005/0216770 A1 * 9/2005 Rowett et al. ................. 713/201
2013/0042172 A1 * 2/2013 Mansfield et al. ............ 715/234

OTHER PUBLICATIONS

Yong Ho Kim, Comparative Analysis of Soft State and Hard State Protocols Based on Hidden Markov Model for the Application of Mobile Devices, 2005, IEEE, pp. 99 and 100.*
Shunzheng Yu, Method for recognizing and tracking application based on keyword sequence, Machine translation of CN 101442535. Published in chinese Jun. 27, 2012.*
Deren Chen et al, Method and apparatus for directionally grabbing page resource, Mashin translation of CN 101452463. Published in chinese Jun. 10, 2009.*

* cited by examiner

*Primary Examiner* — Edan Orgad
*Assistant Examiner* — Gita Faramarzi

(57) ABSTRACT

An analysis system for unknown application layer protocols, which could automatically discover unknown applications existing in a network, and then obtain keywords, attribute values, status codes or type codes representing semantic meaning of each field in each type of unknown application as well as message formats, dialogue rules and status transfer relations of application layer protocols by using cluster analysis and optimal partitioning method based on hidden semi-Markov model. Unknown application analysis result could be used for flow management and safety protection of a network. The system has the following advantages: it avoids difficulties arising from manual discovery and analysis of unknown applications, and improves network management efficiency and responding speed against new types of network attacks.

6 Claims, 2 Drawing Sheets

ANALYSIS SYSTEM FOR UNKNOWN APPLICATION LAYER PROTOCOLS

BACKGROUND OF THE INVENTION

This is a continuation-in-part of PCT international application No. PCT/CN2009/074858, filed Nov. 9, 2009.

The present invention relates to the technical field of network management and network safety, and specifically relates to an analysis system for unknown application layer protocols.

On the Internet, apart from various applications based on common and standard application layer protocols, there are also many other kinds of non-standard protocol applications and new types of network attacks. It is a very difficult task for network managers to separate, analyze, identify and thereby to control unknown applications or attacks from massive collected data. Existing protocol analysis tools and also flow management apparatus based on application identification are only applicable to known and standard protocols but not applicable to unknown and new types of protocols, nor can they discover and analyze new types of attacks. The present invention has the following distinctive advantage: It remedies defects of network management and network safety in the technical field of network management and network safety by providing a kind of technology for automatic discovery, automatic clustering, automatic analysis and automatic identification of unknown application layer protocols.

BRIEF SUMMARY OF THE INVENTION

In view of the aforesaid disadvantages now present in the prior art, the present invention provides a kind of technology for automatic discovery, automatic clustering, automatic analysis and automatic identification of unknown application layer protocols. This kind of technology avoids the difficulty of processing massive data manually and enhances network management efficiency, so that network management efficiency can keep pace with the emergence of new types of network applications and cope with new types of network attacks.

The above objects are attained by the present invention as follows.

An automatic analysis method for unknown application layer protocols, comprising an online process for collecting unknown application layer protocols, and an offline process for analyzing the unknown application layer protocols collected;

The online process for collecting the unknown application layer protocols comprises: identifying each data stream at main channels, input and output ports or stream convergence points in a network and collecting the unknown application layer protocols;

The offline process for analyzing the unknown application layer protocols comprises specifically the following steps:
  a. performing cluster analysis on data of the unknown application layer protocols;
  b. searching keywords of the unknown application layer protocols;
  c. exploring dialogue rules of the unknown application layer protocols;
  d. analyzing message formats of the unknown application layer protocols;
  e. estimating status transfer relations of the unknown application layer protocols; and analysis result for the application layer protocols is obtained.

The online process of the present invention executes application identification for each stream and records application layer data of unidentifiable streams. The offline process is activated on demand for analysis of unknown application layer protocols, and it is activated either manually or activated automatically when unknown application layer data accumulates up to a prescribed level.

Specifically, the process for collecting unknown application layer protocols is to establish automata or regular expressions of known applications in advance and then apply the automata or regular expressions for online identification of applications, and store unidentifiable unknown application layer data into a disk.

Further, the offline process for analyzing unknown application layer protocols is detailed as follows:

Specifically, the said step a is to extract data stream flow characteristics, character string characteristics and header information characteristics of each layer from collected unknown application layer data, and use these characteristics to form characteristic vectors for cluster analysis, and treat each resulting cluster as an unknown application.

Specifically, the said step b is to search protocol keywords and frequent keywords sequences from data of each unknown application by using data searching technology.

Specifically, the said step c is to use frequent keywords sequences of the same type of unknown application to establish a prefix tree representing dialogue rules of a respective protocol. Each string of the prefix tree represents a keyword, and each path thereof represents a type of dialogue process.

Specifically, the said step d is to treat application layer data of each data packet as a character string, and then perform syntactic analysis on all character strings to establish automata or regular expressions of message formats of the respective unknown application layer protocol.

Specifically, the said step e is to treat keywords sequences in each stream as a training cluster to estimate status transfer probability matrix of the respective unknown application layer protocol by using hidden Markov model parameter estimation, and to generate probability distribution of observed values which include keywords, character strings length and encoding format.

In order to use the obtained automata or regular expressions for online inspection of the respective application layer protocol, the automata or regular expressions should first be subject to validity verification which comprises specifically testing of a degree which the automata or regular expressions conform with the collected sample streams, and testing of a degree which the automata or the regular expressions reject sample streams of other application layer protocols.

In order to achieve normality testing, the collected sample streams could be tested by using automata or regular expressions of obtained unknown application layer protocols, so as to obtain normality distribution of all samples and normality of each sample, or discover abnormal sample streams.

The present invention is enabled to perform automatic analysis of unknown application layer protocols by collecting unknown application layer data, performing cluster analysis of the unknown application, searching keywords of unknown application layer protocols, exploring dialogue rules of the unknown application layer protocols, analyzing message formats of the unknown application layer protocols and estimating status transfer relations of the unknown application layer protocols. Therefore, the present invention has the following distinctive advantages: a kind of technology for automatic discovery, automatic clustering, automatic analysis and automatic identification of unknown application layer protocols is provided to avoid difficulty of processing massive data manually and enhance network management efficiency, so that network management efficiency can keep pace with the emergence of new types of network applications and network safety and precautionary measures could cope with new types of network attacks.

DETAILED DESCRIPTION OF THE INVENTION

The present invention is further described as follows with reference to the accompanying drawings.

1. System Configuration

Figure 1:
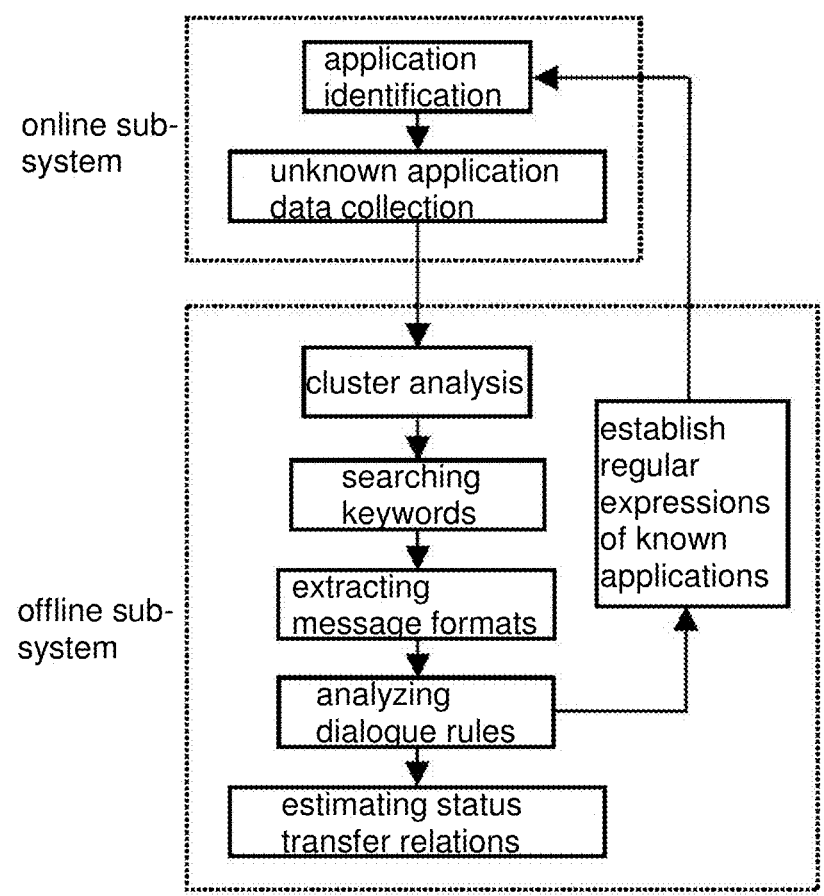
FIG. 1 is a schematic view showing an integral structure of a system of the present invention.

As shown in FIG. 1, the present invention includes two sub-systems: a) An online sub-system; the online sub-system maintains its operation online and connects at main channels, input and output ports, or stream convergence points of a network; its application identification module uses regular expressions established in advance for application identification of every stream, while those unidentifiable original data packets would be treated as samples of unknown applications and stored in a database by an unknown application layer data collection module; b) An offline sub-system; the offline sub-system is activated when unknown application layer data accumulates up to a prescribed level; its cluster analysis module performs cluster analysis on the collected unknown application layer data; its module which performs reversed engineering on unknown application layer protocols uses an optimal partitioning method based on hidden semi-Markov model to search from a data cluster of every kind of unknown applications for their protocol keywords, message formats, dialogue rules and status transfer probability matrix; and by using results from dialogue rules analysis, Grammar Inference algorithm is then utilized to obtain automata or regular expressions used for application identification, and those automata or regular expressions are then sent back to online application identification system for application identification.

2. Application Identification

Firstly, establish regular expressions for each known application or obtain automata by using the present invention. Next, use the regular expressions or automata for online identification at beginning stage of each stream. A specific procedure is set out as follows: a) Extract and rearrange application layer data of each stream; b) Perform matching by using each regular expression of a list of regular expressions; c) Successful matching of a regular expression means that the respective stream is identified; d) Otherwise, mark that stream as "unknown".

3. Collect Unknown Application Data

Store messages of a stream marked as "unknown" in a database according to sequential order. A two-way message sequence of each unknown stream is an observation sequence.

4. Perform Cluster Analysis on Data

Perform cluster analysis when there are enough samples in a cluster of collected unknown application observation sequences. First, obtain statistic information of each observation sequence, including:

Characteristic information of a stream: port number of a party accepting connection, time of stream continuity, total number of data packets transferred, total ASCII bytes, total binary bytes, statistical characteristics of lengths of the data packets, statistical characteristics of intervals of arrival time of data packets etc, in which, the statistical characteristics include: maximum value, minimum value, average value, medium value, variance, average value of stream beginning stage and average value of stream ending stage.

Characteristic information of load: number of ASCII bytes and binary bytes in each message, if the load is enciphered or compressed, frequent sub character trail at the beginning of a message and frequent sub character trail at the end of a message.

Preface information of stream: key exchange and security association information of tunnel or IPSec.

Use the obtained statistical information to form a characteristic vector: $A=(a_1, a_2, \ldots, a_N)$, and $a_i$ is the $i^{th}$ characteristics of that stream.

Use characteristic vectors for cluster analysis of a cluster of observation sequences; in other words, treat streams having the closest characteristic vectors as a cluster and to separate as far as possible the characteristic vectors between different clusters. The cluster analysis results in obtaining 1 or more clusters. Treat each cluster as a type of unknown application.

5. Model Building

Common message formats on the Internet include: a) Binary format: treat several bits (fixed lengths) as a field whereas each field represents an attribute, and a value taken by the bits in the field is a value of the attribute; b) Type-length-value (TLV) format: wherein a fixed byte length T represents type of attribute, a fixed byte length L represents number of bytes of an attribute value that follows, and a variable byte length V represents a value taken by attribute; c) Keyword format: use specific keywords or status codes etc. to represent semantic meanings or commands, while character strings that follow are contents; d) Pointer format: use pointer to point at a beginning position or an ending position of a field.

Among the above four message formats, some have fields fixed in length, and some have fields variable in length. Strings in fixed mode appear frequently in a message and therefore could be searched and picked out. Strings in fixed mode are collectively referred as "keywords" in the present invention.

Figure 2:
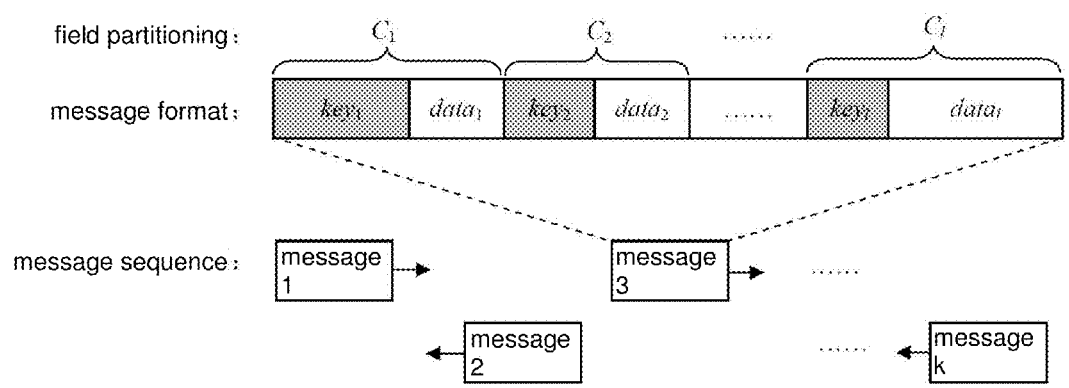
FIG. 2 is a schematic view showing message formats and field partitioning in an observation sequence.

FIG. 2 shows a message format $C_1\|C_2\|\ldots\|C_I$, wherein $C_i$ represents a field fixed or variable in length and "$\|$" represents serial conjunction. $C_i$ itself could be further divided into $key_i\|data_i$ format, wherein $k_i$ is first part of the field, $data_i$ is remaining part of the field and could be 0 in length. Accordingly, analysis of message format becomes an optimal partitioning of character strings or bit strings in a message into $C_1$, $C_2, \ldots, C_I$, and partitioning of $C_i$ into $key_i$ and $data_i$.

Maximum likelihood probability status sequence estimation method of a hidden semi-Markov model (HSMM) is a very suitable method for optimal partitioning, wherein each hidden status represents one or several types of field structure, while time of status continuity represents a length of a respective field.

Figure 3:
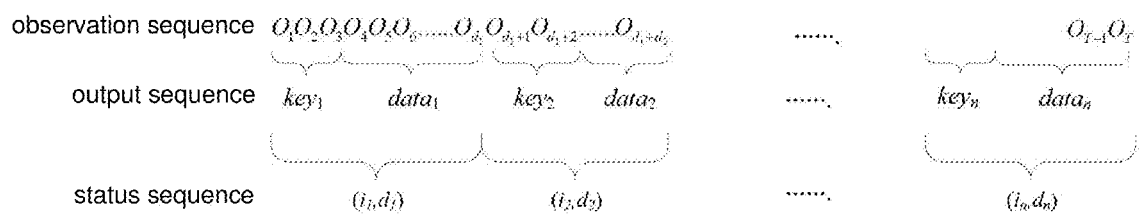
FIG. 3 shows a hidden semi-Markov model of the present invention.

Treat message sequence of an application layer as a character string and refer it as an observation sequence, which is marked as $o_{1:T}=o_1 o_2 \ldots o_T$, wherein T represents length of the observation sequence, and $o_t$ is the $t^{th}$ character of the observation sequence. Status cluster is defined as $S=\{1, 2, \ldots, M\}$. Status sequence to which the observation sequence $o_{1:T}$ corresponds is marked as $S_{1:T}=S_1 S_2 \ldots S_T$ and $S_t \in S$. Use $S_{[t:t']}$ to represent a status which starts at t and ends at t'. $S_{1:T}$ could also be represented by sequence $(i_1,d_1), (i_2,d_2), \ldots, (i_n,d_n)$, that is, $S_{[1:d_1]}=i_1, S_{[d_1+1:d_1+d_2]}=i_2, \ldots$, wherein $i_m \in S$ is status, $d_m$ is a length of continuation of status $i_m$, and $$\sum_{m=1}^{n} d_m = T$$

is satisfied. Therefore, optimal field partitioning of the observation sequence is to find a status sequence $(i_1,d_1), (i_2,d_2), \ldots, (i_n,d_n)$ of a maximum likelihood probability, wherein each status corresponds to a field, and length of continuation of a status is equal to length of a field, and any field or status is restricted within one message and would not extend across two messages. As shown in FIG. 3, a character string beginning at its starting position and corresponding to status $i_m$ and length $d_m$ is $key_m$, which is followed by $data_m$. $d_m$ and $key_m$ could be treated as output values or observation values of a given status $i_m$. When necessary, $data_m$ could also be treated as output value (for example, binary or ASCII) of the given status $i_m$.

6. Initial Parameter Setting

Since relation between messages and relation between fields in messages represent transfer relation between protocol specification and protocol status, transfer between protocol statues could be understood as a first-order Markov process. In other words, set $a_{ij}$ as a probability of transfer from status i to status j, and $$\sum_{j} a_{ij} = 1$$

is satisfied whereas $a_{ii}=0$. Initial probability of status i is defined as $\pi_i$. Since protocol status could not be observed, given observation sequence has multiple possible ways of field partitioning. Within one field, different character strings could be selected as key of that field. Therefore, all sub character strings of an observation sequence are possible output values or observation values key of a status. KEY is defined as a cluster of all output values key of a status, and $k_j(key)$ defined as probability of key being output values in a given status j, and $$\sum_{key \in KEY} k_j(key) = 1$$

is satisfied.

Lengths of data that follows different key usually have different probability distributions. For example, in protocol specification of Simple Mail Transfer Protocol (SMTP), data of keywords "MAIL" and "RCPT" is a mailing address and generally consists of not more than 30 characters. data following keyword "DATA" is mail text and consists of varying ranges of length distribution from a few hundreds to a few thousands characters. Therefore, length of field, that is, length of continuation of a status, is related not only to status but also to key contained in that field. In a condition under a given status j and its output value being key∈KEY, probability of d being length of continuation of a status is $l_{j,key}(d)$, and $$\sum_{d} l_{j,key}(d) = 1$$

is satisfied, wherein $|key| \leq d \leq D_{max}$, with $D_{max}$ being a maximum length of continuation of a status and $|key|$ being length of key. Besides length of field, encoding format (ASCII, binary, or ASCII and binary) of character string following key could also be considered, in other words, in a condition under a given status j and its output value being key∈KEY, make $c_{j,key}(x)$ as probability of x being encoding format of character string that follows, while $c_{j,key}(0)+c_{j,key}(1)+c_{j,key}(2)=1$.

Therefore, model parameter of HSMM could be represented as $\lambda = \{a_{ij}, \pi_i, k_i(key), l_{i,key}(d) | i,j \in S, key \in KEY\}$. Given a training cluster, forward/backward algorithm of HSMM could be used to complete estimation of model parameter $\lambda$.

In general, initial values of $a_{ij}$ and $\pi_i$ have very little influence on model parameter eventually obtained from training, and equiprobability distribution could be simply obtained. In observation sequence, number of occurrence of short character strings is larger than number of occurrence of long character strings, but long character strings are more likely to be intact keywords. During initialization, make $k_j(key)=1/|KEY|$, wherein $|KEY|$ is number of elements in a KEY cluster and key is any one of the elements in KEY, in other words, obtain equiprobability distribution for all the key. At the same time, set $l_{j,key}(d)=ce^{-\tau(d-|key|)}$ as initial probability distribution of length $d \geq |key|$ of each field in a condition when given status j and key, wherein $|key|$ is length of key, $d-|key|$ is length of data that follows the key, $\tau$ is a parameter yet to be defined, $\tau=5$ could be resulted according to empirical data, c is a normalization factor resulting in $$\sum_{d} l_{j,key}(d) = 1.$$

Suppose the length of key has certain restrictions, $KL_{max}$ is introduced as the maximum length of key. In general, 10 bytes should be enough for the $KL_{max}$. When the length of key exceeds $KL_{max}$, the key would be treated as multiple key' by a final result.

7. Model Parameter Estimation

A status ending at t' is represented by $S_{t']}$, and a status starting at t is represented by $S_{[t}$. $S_{[t:t'}$ represents a status started at t but not yet ended at t'. $S_{[t:t']}$ represents a status already started at t and ended at t'. Suppose in a section $C_m = o_{t+1:t+d}$ of an observation sequence, possible range of value of a hidden status output value key is $\{o_{t+1:t+kl} | 1 \leq kl \leq min(d, KL_{max})\}$. When given $S_{[t+1:t+d]}=j$, probability of $o_{t+1:t+d}$ observed is:

$$b_{j,d}(o_{t+1:t+d}) = \sum_{kl=1}^{min(d,KL_{max})} k_j(o_{t+1:t+kl}) l_{j,o_{t+1:t+kl}}(d)$$

Define forward variable $\alpha_t(j)=P[S_{t]}=j, o_{1:t}|\lambda]$ wherein its iterative computing formula is:

$$\alpha_t(j) = \begin{cases} \pi_j & t = 0 \\ \sum_{i=1}^{M} \sum_{d=1}^{D_t} \alpha_{t-d}(i) a_{ij} b_{j,d}(o_{t-d+1:t}) & 1 \le t \le T, \end{cases}$$

wherein $D_t$ is a maximum length of status j ended with a $t^{th}$ character. By using the forward variable obtained by iteration, likelihood probability of observation sequence relative to given model $\lambda$ is computed as:

$$Lkh = P[o_{1:T} | \lambda] = \sum_{j=1}^{M} \alpha_T(j).$$

Define backward variable $\beta_t(i) = P[o_{t+1:T} | S_t = i, \lambda]$, wherein its iterative computing formula is:

$$\beta_t(i) = \begin{cases} 1 & t = T \\ \sum_{j=1}^{M} \sum_{d=1}^{E_t} a_{ij} b_{j,d}(o_{t+1:t+d}) \beta_{t+d}(j) & 1 \le t < T, \end{cases}$$

wherein $E_t$ is a maximum length of continuation of status j having a starting position at a $t+1^{th}$ character.

Define intermediate variable:

$$\xi_t(i, j) = P[S_t = i, S_{t+1} = j, o_{1:T} | \lambda]$$
$$= \alpha_t(i) \sum_{d=1}^{E_t} a_{ij} b_{j,d}(o_{t+1:t+d}) \beta_{t+d}(j),$$

wherein $i \ne j, 0 \le t \le T-1$, $$\psi_t(j, kl) = P[S_{t+1:t+kl} = j, o_{1:T} | \lambda]$$
$$= \sum_{i=1}^{M} \sum_{d=kl}^{D_t} \alpha_t(i) a_{ij} k_j(o_{t+1:t+kl}) l_{j,o_{t+1:t+kl}}(d) \beta_{t+d}(j),$$

wherein $t \le T-kl, kl \ge 1$, $$\zeta_t(j, \text{key}, d) = P[S_{t-d+1:t} = j, o_{t-d+1:t-d+|\text{key}|} = \text{key}, o_{1:T} | \lambda]$$
$$= \sum_{i=1}^{M} \alpha_{t-d}(i) a_{ij} k_j(\text{key}) l_{j,\text{key}}(d) \beta_t(j) \delta(o_{t-d+1:t-d+|\text{key}|} - \text{key}),$$

wherein $t \ge 1, D_t \ge d \ge |\text{key}| \ge 1$. $\delta(o_{t-d+1:t-d+|\text{key}|} - \text{key}) = 1$ if $o_{t-d+1:t-d+|\text{key}|} = \text{key}$; otherwise, 0 would be resulted.

Use multiple sequence training model. Suppose a training cluster comprises $N^{th}$ observation sequences, wherein $o_{1:T^{(m)}}^{(m)}$ is an $m^{th}$ observation sequence wherein $T^{(m)}$ is its length. $Lkh^{(m)}, \xi_t^{(m)}(i,j), \psi_t^{(m)}(j,kl)$ and $\zeta_t^{(m)}(j,\text{key},d)$ could be computed from $o_{1:T^{(m)}}^{(m)}$.

Model parameter is then estimated by using the following formula:

$$\hat{a}_{ij} = \sum_{m=1}^{N} \frac{1}{Lkh^{(m)}} \sum_{t=1}^{T^{(m)}-1} \xi_t^{(m)}(i, j)$$

$$\hat{k}_j(\text{key}) = \sum_{m=1}^{N} \frac{1}{Lkh^{(m)}} \sum_{t=0}^{T^{(m)}-|\text{key}|} \psi_t^{(m)}(j, |\text{key}|) \cdot \delta(o_{t+1:t+|\text{key}|}^{(m)} - \text{key})$$

$$\hat{l}_{j,\text{key}}(d) = \sum_{m=1}^{N} \frac{1}{Lkh^{(m)}} \sum_{t=d}^{T^{(m)}} \zeta_t^{(m)}(j, \text{key}, d)$$

$$\hat{\pi}_i = \sum_{m=1}^{N} \sum_{j=1}^{M} \frac{1}{Lkh^{(m)}} \xi_0^{(m)}(i, j)$$

Finally, perform normalization processing so that a new estimated value $\hat{\lambda} = \{\hat{a}_{ij}, \hat{\pi}_i, \hat{k}_j(\text{key}), \hat{l}_{j,\text{key}}(d)\}$ of the model parameter could be obtained. Repeat such estimation process of model parameter and a set of model parameter values could be eventually obtained by convergence. This kind of iterative estimation process has been proved to be a monotonic increase process of likelihood probability and therefore must be a convergent process. According to empirical data, several iterations could already result in very close proximity to convergence value. A maximum of over ten and less than twenty times of iterations could already result in convergence of a fixed point with very high precision.

8. Field Partitioning of Maximum Likelihood Probability

After model parameter $\lambda$ is obtained by estimation, start to perform field partitioning of maximum likelihood probability. As mentioned above, any one of observation sequences in a sample cluster has multiple possible ways of field partitioning. Maximum likelihood probability (ML) estimation of a hidden status sequence would be an optimal field partitioning of an observation sequence. Therefore, status sequence of maximum likelihood probability could be estimated by using the following algorithm, and various statuses could then determine various keywords in a protocol:

Let $G(j, \text{key}, d) = k_j(\text{key}) l_{j,\text{key}}(d)$ and define forward variable:

$$\delta_t(j, d) \equiv \max_{S_{1:t-d}} P[S_{1:t-d}, S_{[t-d+1:t]} = j, o_{1:t} | \lambda]$$
$$= \max_{i, d', kl} \delta_{t-d}(i, d') a_{ij} G(j, o_{t-d+1:t-d+kl}, d),$$

wherein $1 \le t \le T, 1 \le d \le D_t, 1 \le d' \le D_{t-d'}$ and $1 \le kl \le KL_{max}$.

Use $\Psi(t,j,d)$ to record a last previous status selected by $\delta_t(j,d)$ and its time of continuation; at the same time, use Key_ML(t,j,d) to record keywords selected by current status' field partitioning (j,d):

$$(i^*, d^*, kl^*) = \underset{i, d', kl}{\operatorname{argmax}} \delta_{t-d}(i, d') a_{ij} G(j, o_{t-d+1:t-d+kl}, d)$$

$$\Psi(t, j, d) = (t - d, i^*, d^*)$$

$$\text{Key\_ML}(t, j, d) = o_{t-d+1:t-d+kl^*}$$

When forward computation is completed, let $t_1 = T$, and perform path backtracking in a reversed direction:

$$(j_1, d_1) = \underset{i,d}{\operatorname{argmax}} \delta_T(i, d)$$

$$kw_1 = \text{Key\_ML}(t_1, j_1, d_1)$$

$$(t_2, j_2, d_2) = \Psi(t_1, j_1, d_1)$$

$$kw_2 = \text{Key\_ML}(t_2, j_2, d_2)$$

$$\ldots$$

$$(t_n, j_n, d_n) = \Psi(t_{n-1}, j_{n-1}, d_{n-1})$$

$$kw_n = \text{Key\_ML}(t_{n-1}, j_{n-1}, d_{n-1})$$

Algorithm ends when it is determined that $s_1=j_n$. Status sequence $[(i_1,\tau_1), \ldots, (i_n,\tau_n)]$ of maximum likelihood probability and keyword sequence $[\text{key}_1, \ldots, \text{key}_n]$ included in observation sequence are eventually obtained, wherein $i_l=j_{n-l+1}$, $\tau_l=d_{n-l+1}$, $\text{key}_l=kw_{n-l+1}$ and $l=1, \ldots, n$.

9. Obtain Protocol Analysis Result

Suppose there are a total number of $N^{th}$ observation sequences in the training cluster, wherein a status sequence of maximum likelihood probability obtained by an $m^{th}$ observation sequence $o_{1:T^{(m)}}{}^{(m)}$ is $[(i_1{}^{(m)},\tau_1{}^{(m)}), \ldots, (i_n{}^{(m)},\tau_{n_m}{}^{(m)})]$, keyword sequence included in the observation sequence is $[\text{key}_1{}^{(m)}, \ldots, \text{key}_{n_m}{}^{(m)}]$, keyword cluster is $$key^{(m)} = \bigcup_{i=1}^{n_m} key_i^{(m)},$$

message sequence is $M^{(m)}=[M_1{}^{(m)}, \ldots, M_{l_m}{}^{(m)}]$, wherein each message $M_j{}^{(m)}$ includes a keyword sub sequence $M_j{}^{(m)}=[\text{key}_{i_j}{}^{(m)}, \ldots, \text{key}_{i_{j+1}-1}{}^{(m)}]$. Gather all the observation sequences in the total number of N and obtain protocol keyword cluster of a respective protocol being $$KEY = \bigcup_{m=1}^{N} key^{(m)},$$

message format cluster being $$F = \bigcup_{m=1}^{N} \bigcup_{j=1}^{l_m} M_j^{(m)},$$

and dialogue sequence cluster being $$E = \bigcup_{m=1}^{N} M^{(m)}.$$

10. Determine Dialogue Rules

Establish a prefix tree to represent dialogue rules of a respective protocol by using the dialogue sequence cluster $$E = \bigcup_{m=1}^{N} M^{(m)}$$

as obtained, wherein each transfer line of the tree represents a keyword and each path extended from the tree root represents a dialogue sub sequence, in other words, a type of interactive process of a respective application layer protocol dialogue.

Substitute each transfer line of the prefix tree with an automaton corresponding to its respective keyword to form an even larger automaton; simplify the automaton via grammar inference (GI) algorithm by using streams of other application layer protocols as negative examples cluster; the automata or regular expressions eventually obtained are used for online identification of the respective protocol.

11. Obtain Status Transfer Relations

Status transfer probability matrix of the protocol is determined by the model parameter $\hat{\lambda}=\{\hat{a}_{ij},\hat{\pi}_i,\hat{k}_j(\text{key}),\hat{l}_{j,\text{key}}(d)\}$ as trained and obtained: Remove from $\hat{a}_{ij}$ those statuses with very small inward transfer probability and those statuses with a certain outward transfer probability near to 1. The $\hat{a}_{ij}$ eventually obtained reflects status transfer relations of an unknown application layer protocol. At the same time, $\hat{\pi}_i$ is initial status distribution of the protocol, $\hat{k}_j(\text{key})$ is a probability of occurrence of keyword key when given status j, and $\hat{l}_{j,\text{key}}(d)$ is a probability of having d being length of field when given key and status j.

What is claimed is:

1. An analysis system for unknown application layer protocols, characterized in that:

the analysis system for unknown application layer protocols comprises the following processing modules: a) A module for collecting unknown application layer data used for online identification of various known applications and storing of unidentifiable application layer data into a disk; b) A module for performing cluster analysis on unknown applications used for performing cluster analysis on collected data and treating each resulting cluster as an unknown application; c) A module for performing reversed engineering on unknown application layer protocols used for optimal partitioning of message sequences based on hidden semi-Markov model (HSMM) to obtain protocol keywords, message formats, dialogue rules and status transfer relations of the unknown applications; the analysis system for unknown application layer protocols adopts the following perspective for processing and model building of the unknown application layer data: a sequence formed by messages in two-way transmission during an unknown application layer protocol session process is called an observation sequence, wherein the observation sequence consists of a series of characters $O_1 O_2 \ldots O_T$, $O_t$ represents the $t^{th}$ character, T represents the length of the observation sequence, and a sub-sequence of observations or a sub character string started at the $t^{th}$ character and ended at the $t'^{th}$ character is marked as $O_{t:t'}=O_t O_{t+1} \ldots O_{t'}$; each message includes one to more than one field fixed or variable in length each field is formed by a protocol keyword followed by 0 to more than 1 characters; and transition from a field to another field is a first-order Markov process.

2. The analysis system for unknown application layer protocols as in claim 1, characterized in that, the HSMM is defined as follows:

A state sequence corresponding to $O_{t:t'}$ is $S_{t:t'}=S_t S_{t+1} \ldots S_{t'}$, wherein $S_k \in S$, represents the $k^{th}$ state corresponding to observation $O_k$, k=t, t+1, \ldots, t', $S_t$, $S=\{1, 2, \ldots, M\}$ is the set of all states and M is the size of the set; a state ending at t' is represented by $S_{t']}$; a state starting at t is represented by $S_{[t}$; $S_{[t:t'}$ represents a state started at t but not yet ended at t' meaning $S_{[t}=S_{t+1}=\ldots=S_{t'}$; $S_{t:t']}$ represents a state already started before/at t and ended at t' meaning $S_t=S_{t+1}=\ldots=S_{t']}$; and $S_{[t:t']}$ represents a state started at t and ended at t' with a state length of t'−t+1 characters, meaning $S_{[t}=S_{t+1}=\ldots=S_{t']}$; let $a_{ij}$ be a probability of transition from state i to state j, and $$\sum_j a_{ij} = 1$$

is satisfied whereas $a_{ii}=0$; initial probability of the state i is defined as $\pi_j$; KEY is defined as a set of all output values (i.e., observable keywords) of states, and $k_j(key)$ is defined as probability of key being output value (i.e., observed keyword) in the given state j, and $$\sum_{key \in KEY} k_j(\text{key}) = 1$$

is satisfied; when given state j and its output value being key∈KEY, probability of d≥[key] being length of continuation of the sate is $I_{j,key}(d)$, [key] is length of key and $$\sum_d l_{j,key}(d) = 1$$

is satisfied; and $\lambda = \{a_{ij}, \pi_i, k_j(key), I_j, key(d) | i, j \in S, key \in KEY, d \geq [key]\}$ represents the set of all the model parameters.

3. The analysis system for unknown application layer protocols as in claim 2, characterized in that, initial values of model parameter of the HSMM are selected as follows: $a_{ij}=1/|S|$, $\pi_i=1/|S|$, $k_j(key)=1/|KEY|$, $1_{j,key}(d)=ce^{-\tau(d-|key|)}$, and for all i, j∈S, key∈KEY, wherein [KEY] represents keyword number, |S|=M represents state number, |key| represents length of key, d represents length of the state, d−|key| represents the number of the rest characters except key in the duration of the state, τ represents an attenuation factor taking an empirical value of 5, c represents a normalization factor resulting in $$\sum_{d \geq |key|} l_{j,key}(d) = 1;$$

method of defining variables of the HSMM is as follows: $a_t(i)$ represents a forward variable being defined as $\alpha_t(j)=P[S_{t]}=j, o_{1:t}|\lambda]$, $\beta_t(i)$ represents a backward variable being defined as $\beta_t(i)=P[o_{t+1:T}|S_{t]}=i,\lambda]$, and $\xi_t(i,j)$, $\psi_t(j,kl)$ and $\zeta_t(j,key,d)$ represent intermediate variables being defined respectively as $\xi_t(i,j)=P[S_{t]}=i,S_{[t+1}=j,o_{1:t}|]$, $\omega_t(j,kl)=P[S_{[t+]:t+kl}=j,o_{1:t}|\lambda]$, and $\zeta_t(j,key,d)=P[S_{[t-d+1t]}=j,o_{t-d+1:t-d+|key|}=key,o_{1:T}|\lambda]$, whereas kl≥1 is an integer.

4. The analysis system for unknown application layer protocols as in claim 3, characterized in that, an optimal partitioning method of observation sequence is field partitioning according to maximum likelihood probability; the method is detailed as follows: forward computation let $$G(j, key, d) = k_j(key) l_{j,key}(d),$$

and define $$\delta_t(j, d) \equiv \max_{S_{1:t-d}} P[S_{1:t-d}, S_{[t-d+1:t]} = j, o_{1:t} | \lambda]$$

$$= \max_{i,d',kl} \delta_{t-d}(i, d') a_{ij} G(j, o_{t-d+1:t-d+kl}, d)$$

$$(i^*, d^*, kl^*) = \operatorname{argmax}_{i,d',kl} \delta_{t-d}(i, d') a_{ij} G(j, o_{t-d+1:t-d+kl}, d)$$

$$\Psi(t, j, d) = (t-d, i^*, d^*)$$

$$\text{Key\_ML}(t, j, d) = o_{t-d+1:t-d+kl^*}$$

next, let $t_1=T$, and perform backtracking in a reversed direction:

$$(j_1, d_1) = \underset{i,d}{\arg\max}\, \delta_T(i, d)$$

$$kw_1 = \text{Key\_ML}(t_1, j_1, d_1)$$

$$(t_2, j_2, d_2) = \Psi(t_1, j_1, d_1)$$

$$kw_2 = \text{Key\_ML}(t_2, j_2, d_2)$$

$$(t_n, j_n, d_n) = \Psi(t_{n-1}, j_{n-1}, d_{n-1})$$

$$kw_n = \text{Key\_ML}(t_n, j_n, d_n)$$

algorithm ends when $t_n=1$; state sequence $[(i_1,\tau_1),\ldots,(i_n,\tau_n)]$ of maximum likelihood probability and keyword sequence $[key_1,\ldots,key_n]$ included in the observation sequence are eventually obtained, wherein, $i_l=j_{n-l+1}$ is the l'th state, $\tau_l=d_{n-l+1}$ is the duration of the l'th state, $key_l=kw_{n-l+1}$ is the keyword included in the field corresponding to the l'th state, and l=1, ..., n.

5. The analysis system for unknown application layer protocols as in claim 4, characterized in that, a multiple sequence training method of the HSMM is as follows:

$$\hat{a}_{ij} = \sum_{m=1}^{N} \frac{1}{Lkh^{(m)}} \sum_{t=1}^{T^{(m)}-1} \xi_t^{(m)}(i, j)$$

$$\hat{k}_j(\text{key}) = \sum_{m=1}^{N} \frac{1}{Lkh^{(m)}} \sum_{t=0}^{T^{(m)}-|key|} \psi_t^{(m)}(j, |key|) \cdot \delta(o_{t+1:t+|key|}^{(m)} - \text{key})$$

$$\hat{l}_{j,key}(d) = \sum_{m=1}^{N} \frac{1}{Lkh^{(m)}} \sum_{t=d}^{T^{(m)}} \zeta_t^{(m)}(j, \text{key}, d)$$

$$\hat{\pi}_i = \sum_{m=1}^{N} \sum_{j=1}^{M} \frac{1}{Lkh^{(m)}} \xi_0^{(m)}(i, j)$$

Suppose a training set comprises N observation sequences, wherein $o_{1:T^{(m)}}^{(m)}$ the mth observation sequence wherein $T^{(m)}$ is its length;

$$Lkh^{(m)} = \sum_{j=1}^{M} \alpha_{T^{(m)}}^{(m)}(j),$$

$\xi_t^{(m)}(i,j)$, $\psi_t^{(m)}(j,kl)$, and $\zeta_t^{(m)}(j,key,d)$ could be computed from $o_{1:t^{(m)}}^{(m)}$; model parameters are then estimated by using the following formula:

$$\hat{a}_{ij} = \sum_{m=1}^{N} \frac{1}{Lkh^{(m)}} \sum_{t=1}^{T^{(m)}-1} \xi_t^{(m)}(i,j)$$

$$\hat{k}_j(key) = \sum_{m=1}^{N} \frac{1}{Lkh^{(m)}} \sum_{t=0}^{T^{(m)}-|key|} \psi_t^{(m)}(j,|key|) \cdot \delta(o_{t+1:t+|key|}^{(m)} - key)$$

$$\hat{l}_{j,key}(d) = \sum_{m=1}^{N} \frac{1}{Lkh^{(m)}} \sum_{t=d}^{T^{(m)}} \zeta_t^{(m)}(j,key,d)$$

$$\hat{\pi}_i = \sum_{m=1}^{N} \sum_{j=1}^{M} \frac{1}{Lkh^{(m)}} \xi_0^{(m)}(i,j)$$

wherein $\delta(o_{t+1:t+|key|}^{(m)} - key)=1$ if $o_{t+1:t+|key|}^{(m)}=key$, otherwise 0, Finally, perform normalization processing so that a new estimated values $\hat{\lambda}=\{\hat{a}_{ij},\hat{\pi}_i,\hat{k}_j(key),\hat{l}_{j,key}(d)\}$ of the model parameters could be obtained; repeat such estimation process of model parameters until a set of fixed model parameter values is eventually obtained by convenience.

6. The analysis system for unknown application layer protocols as in claim 5, characterized in that, a method of obtaining unknown application layer protocol analysis result is as follows:

After the model parameters $\hat{\lambda}=\{\hat{a}_{ij},\hat{\pi}_i,\hat{k}_j(key),\hat{l}_{j,key}(d)\}$ are obtained by estimation, perform field partitioning of maximum likelihood probability on all N observation sequences in the training set; the mth observation sequence $o_{t:T^{(m)}}^{(m)}$ produced in the mth session of the protocol consists of a message sequence $M^{(m)}=[M_1^{(m)}, \ldots, M_{l_m}^{(m)}]$ wherein $M^{(m)}$ represents the mth message sequence and $M_j^{(m)}$ represents the j'th message in the message sequence; a state sequence, keyword sequence, and keyword set of maximum likelihood probability obtained by $o_{1:t^{(m)}}^{(m)}$ are $[(i_1^{(m)},\tau_1^{(m)}), \ldots, (i_n^{(m)},\tau_{n_m}^{(m)})]$, $key_1^{(m)}, \ldots, key_{n^m}^{(m)}$, and $$key^{(m)} = \bigcup_{i=1}^{n_m} key_i^{(m)},$$

respectively, wherein each message $M_j^{(m)}$ includes a sub sequence of keywords $M_j^{(m)}=[key_{i^j}^{(m)}, \ldots, key_{i^{j+1}-1}^{(m)}, \ldots, key_{i^{j+1}-1}^{(m)}]$ representing its format, the subscript $i_j$ represents the subscript of the first j'th message and $i_{j+1}-1$ represents the subscript of the last keyword of the message; next, perform gathering to obtain protocol keyword set KEY of the respective protocol being $$KEY = \bigcup_{m=1}^{N} key^{(m)},$$

message format set F being $$F = \bigcup_{m=1}^{N} \bigcup_{j=1}^{l_m} M_j^{(m)},$$

and session set being $$E = \bigcup_{m=1}^{N} M^{(m)};$$

establish a prefix tree to represent session rules of the respective protocol by using the session set E; $\hat{a}_{ij}$ represents state transition probability matrix of the protocol, and $\hat{\pi}_i$ represents initial state distribution of the protocol.

* * * * *